United States Patent [19]
Takamura et al.

[11] Patent Number: 5,246,215
[45] Date of Patent: Sep. 21, 1993

[54] SPRING SEAT MEMBER WITH NOTCH FOR GROUND SPRING END

[75] Inventors: Noritoshi Takamura; Yuichi Nagase, both of Kanagawa, Japan

[73] Assignee: NHK Spring Co., Ltd., Kanagawa, Japan

[21] Appl. No.: 837,561

[22] Filed: Feb. 18, 1992

Related U.S. Application Data

[63] Continuation of Ser. No. 536,532, Jun. 12, 1990, abandoned.

[30] Foreign Application Priority Data

Jun. 16, 1989 [JP] Japan ................................. 1-153911

[51] Int. Cl.$^5$ .............................. F16F 1/02; F01L 3/10
[52] U.S. Cl. ...................................... 267/170; 267/179
[58] Field of Search ............... 267/170, 166, 166.1, 267/169, 179, 180, 286, 171, 172, 174, 178, 287

[56] References Cited

U.S. PATENT DOCUMENTS

| | | | |
|---|---|---|---|
| 1,878,128 | 11/1927 | Griswold | 267/286 |
| 2,514,394 | 7/1950 | Irving | 64/15 |
| 3,602,205 | 8/1971 | Turkish | 267/47 |
| 4,111,407 | 9/1978 | Stager | 267/166 |
| 4,120,489 | 10/1978 | Borlinghaus | 267/166.1 |
| 4,475,725 | 10/1984 | Niemann | 267/179 |
| 4,538,563 | 9/1985 | Mayers | 267/166 X |
| 4,590,900 | 5/1986 | Hayashi | 267/179 X |
| 4,807,859 | 2/1989 | Bolthouse | 267/170 |
| 4,970,997 | 11/1990 | Inoue et al. | 267/166 X |
| 4,993,376 | 2/1991 | Fukutome et al. | 267/166 X |

FOREIGN PATENT DOCUMENTS

| | | |
|---|---|---|
| 6619 | 7/1952 | Fed. Rep. of Germany . |
| 1930244 | 9/1965 | Fed. Rep. of Germany . |
| 2942135 | 4/1981 | Fed. Rep. of Germany . |
| 47-22363 | 6/1972 | Japan . |
| 0209238 | 9/1987 | Japan ................................. 267/179 |
| 0031032 | 2/1990 | Japan ................................. 267/170 |
| 2218492 | 11/1989 | United Kingdom ................ 267/179 |

OTHER PUBLICATIONS

Japanese Industrial Standards B2704 and G3566.

Primary Examiner—Robert J. Oberleitner
Assistant Examiner—Josie A. Ballato
Attorney, Agent, or Firm—Baker & Daniels

[57] ABSTRACT

A spring system for applying an elastic restoring force to a moveable member undergoing a reciprocating movement. This spring system includes a coil spring made of steel and having a moveable end engaged to a moveable member and a fixed end engaged to a fixed member. The moveable end is formed as an open end. A spring seat member is interposed between the moveable end of the coil spring and the moveable member. The spring seat member has a receiving surface contoured to snugly receive the moveable end of the coil spring.

3 Claims, 5 Drawing Sheets

SPRING SEAT MEMBER WITH NOTCH FOR GROUND SPRING END

This is a continuation of application Ser. No. 07/536,532, filed Jun. 12, 1990, now abandoned.

TECHNICAL FIELD

The present invention generally relates to a spring system for applying a restoring force or other urging force to a reciprocating member, and in particular to a spring system which is suitable for use as valve springs for intake valves and exhaust valves in reciprocating internal combustion engines which are adapted for high speed operation.

BACKGROUND OF THE INVENTION

It is known that certain irregular movements may occur to spring systems which are subjected to impulsive vibrational forces such as valve springs for intake and exhaust valves of internal combustion engines and suspension springs for vehicles due to the resonant movements of the springs. Japanese patent publication No. 47-22363 discloses a coil spring having an uneven winding pitch as an attempt to obtain a nonlinear spring property and raise the resonant point of the spring system.

In compression coil springs, end portions are typically ground into planar shapes so that their longitudinal center lines may stay straight even when they are substantially compressed. In particular, in high precision applications, it is common to use coil springs having closed and ground ends.

However, the closed ends do not contribute to the effective number of turns of the coil winding, but rather increase the overall height of the compression coil spring in fully compressed state, and increase the overall weight of the coil spring. This problem is particularly pronounced when the coil spring has an uneven winding pitch.

BRIEF SUMMARY OF THE INVENTION

In view of such problems of the prior art, a primary object of the present invention is to provide a spring system which is light in weight and small in height and can yet apply an effective spring force to a moving part moving at an extremely high speed.

A second object of the present invention is to provide a high performance spring system which is easy and economical to manufacture.

These and other objects of the present invention can be accomplished by providing a spring system for applying an elastic restoring force to a moveable member undergoing a reciprocating movement, comprising: a coil spring made of steel and having a moveable end engaged to said moveable member and a fixed end engaged to a fixed member, said moveable end being formed as an open end; and a spring seat member interposed between said moveable end of said coil spring and said moveable member, and having a receiving surface contoured to snugly receive said moveable end of said coil spring.

Thus, since the mass of the spring system, in particular the mass of the moving part thereof, can be reduced, it is possible to raise the speed limit of the associated mechanical moving part. Further, since the length of the coil wire which does not contribute to the generation of spring force is substantially eliminated, the overall height of the spring system may be reduced. If the spring seat member is made of material having favorable visco-elastic property, or there is a favorable friction between the end portions of the coil spring and the spring seat members, it is possible to obtain a desired damping effect.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
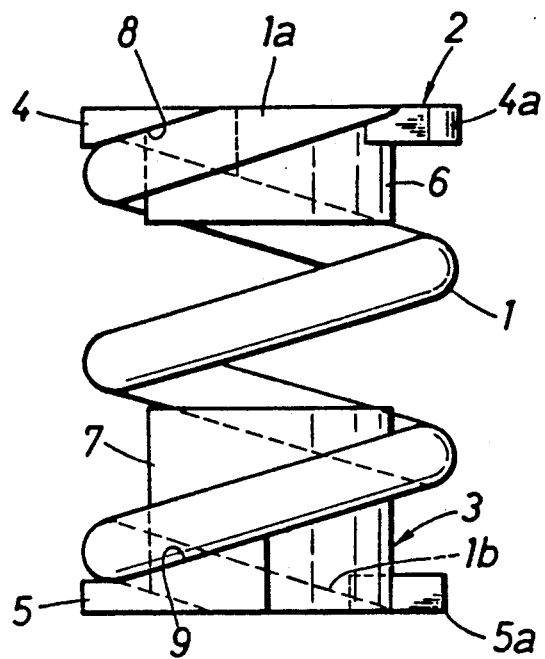
FIG. 1 is a side view of a first embodiment of the spring system according to the present invention.
Figure 2:
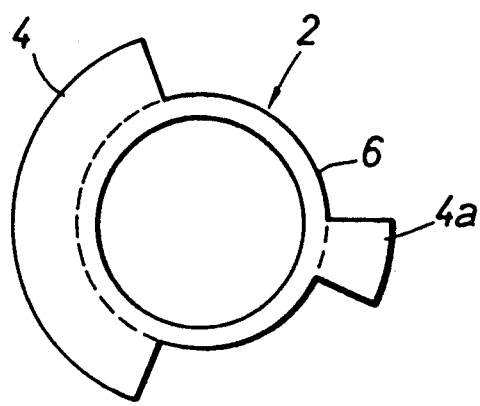
FIG. 2 is an end view of one of the spring seat members shown in FIG. 1.

In the following disclosure, like reference numerals designate like parts and elements throughout all the embodiments.

FIG. 1 shows a spring system according to the present invention which comprises a coil spring 1 employed as a valve spring and spring seat members 2 and 3 supporting the respective ends of the valve spring 1.

Conventionally, the two ends of valve springs consisted of closed ends, and were additionally ground to have flat end surfaces (JIS B2704). In particular, when it is desired to avoid bending of the axial center line of the coil spring as it is compressed, each of the closed end portions is required to have approximately 1.5 turns of coil wire which involves a relatively small gap between adjoining turns of the coil wire. However, such closed end portions are not only ineffective in producing a spring force, but also prevent the overall height and the weight of the coil spring to be reduced. On the other hand, according to this embodiment of the present invention, the valve spring 1 consists, for instance, of steel wire for valve springs (JIS G3566), wherein the wire is made of a steel alloy containing silicon and chromium, and is provided with open ends 1a and 1b which are each ground into a plane perpendicular to the axial center line of the coil spring 1 at its outermost end. In this particular embodiment, the coil spring is wound at an even pitch over its entire length.

Each of the spring seat members 2 and 3 consists of synthetic resin, aluminum alloy or other light-weight material, and is provided with a fan-shaped radial flange 4 or 5 defining a receiving surface complementary to the associated end surface of the coil spring 1 so as to maintain the central axial line of the coil spring 1 straight even when it is compressed, and a tubular central portion 6 or 7 which is coaxial with the radial flange 4 and 5, and is fitted into the inner bore of the coil spring in close or sliding contact therewith. Thus, the two end portions 1a and 1b are supported by arcuate shoulder surfaces defined by the tubular portions 6 and 7 and the flanges 4 and 5.

Since the end portions 1a and 1b are closely wrapped around the central tubular portions 6 and 7, the friction existing between the outer circumferential surfaces of the central tubular portions 6 and 7 and the inner circumferential surface of the coil spring 1 produces a favorable damping effect. The receiving surfaces are further provided with circumferential stoppers 4a and 5a which restrain the circumferential movement of the coil wire ends of the coil spring 1.

Figure 3:
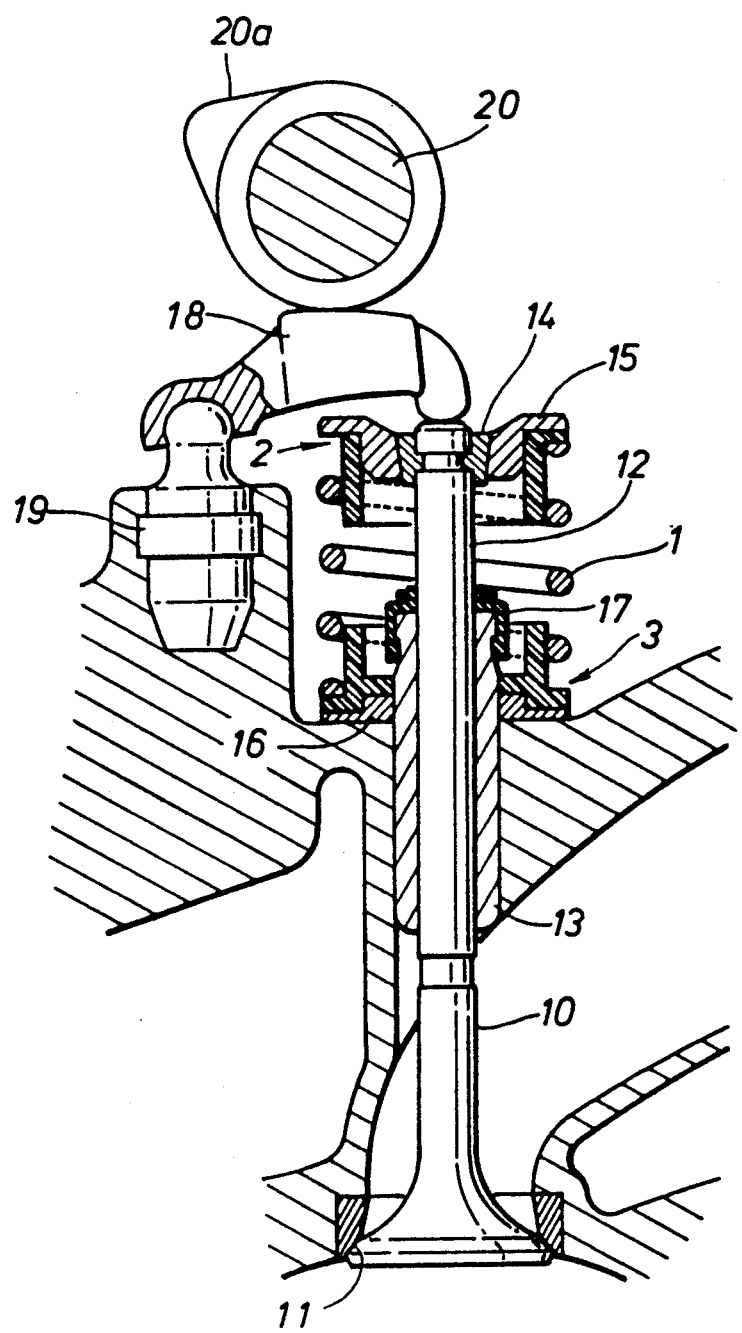
FIG. 3 is a fragmentary sectional view of a valve actuating mechanism to which the present invention is applied.

FIG. 3 shows how this valve spring 1 and the spring seat members 2 and 3 may be actually used. A valve 10 selectively communicates the combustion chamber of an internal combustion engine with an intake passage or an exhaust passage by cooperating with a valve seat 11 defined in the cylinder head, as an intake valve or an exhaust valve as the case may be. The stem 12 of the valve 10 is slidably received in a valve guide 13 which is in turn press fitted into the cylinder head, and one of the spring seat members 2 is engaged with the outer end of the stem 12 by means of a split cone 14 and an annular spring retainer 15. The other spring seat member 3 is supported by an annular planar surface defined in a part of the cylinder head surrounding the valve guide 13 with an annular spring retainer 16 interposed therebetween. Numeral 17 denotes a stem oil seal for preventing the infiltration of oil into the combustion chamber.

To the outer end surface of the stem 12 abuts an end of a rocker arm 18 whose other end is pivotally supported by the cylinder head via a lash adjuster 19. A cam profile surface 20a of the camshaft 20 abuts an intermediate part of the rocker arm 18. Therefore, according to this embodiment, as the camshaft 20 is rotatively driven, the rocker arm 18 rotates downwardly around the lash adjuster 19 by being driven by the cam profile surface 20a, and the stem 12 of the valve 10 is moved downwardly in FIG. 3 against the biasing force of the valve spring 1, thereby opening the valve 10.

Figure 4A:
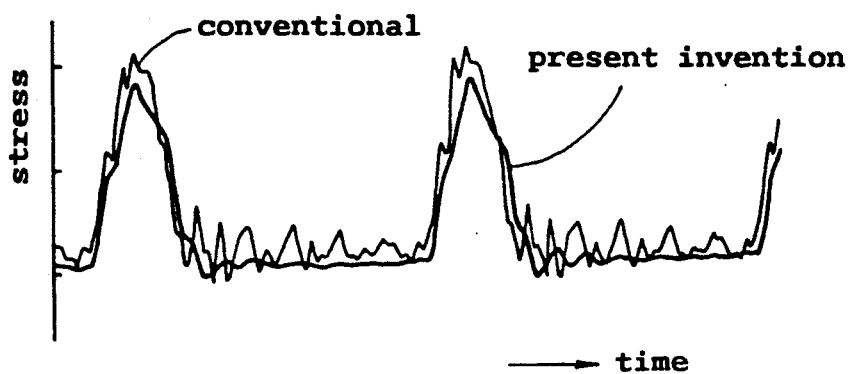
FIGS. 4a through 4c are graphs comparing the properties of a conventional valve spring and a valve spring according to the present invention.

FIG. 4a is a stress-time graph comparing the stress wave forms of a conventional closed end uneven pitch coil spring and an open end even pitch coil spring equipped with spring seat members according to the present invention. As can be seen from this graph, the stress of the coil spring of the present invention indicated by the bold line demonstrates substantially less surging than the stress of the conventional coil spring indicated by the fine line.

Figure 4B:
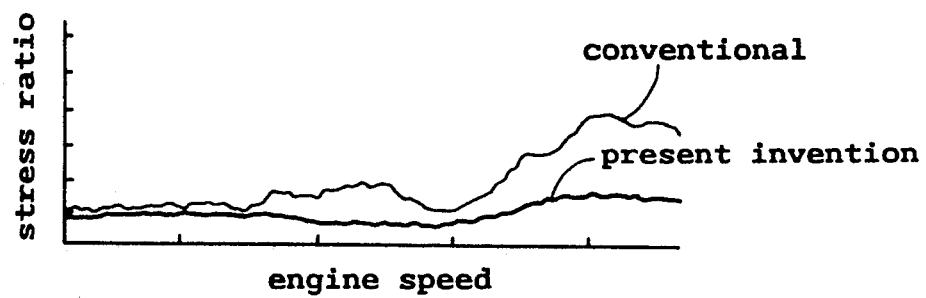

FIG. 4b is a graph showing the relationship between load stress ratio ($\alpha_c =$ [measured stress]/[design stress]) and engine speed. As shown in this graph, the increase in stress is controlled up to 5,000 rpm according to the present invention as indicated by the bold line whereas there is a significant increase in stress as the rotational speed of the engine exceeds 4,000 rpm according to the conventional valve spring as indicated by the fine line.

Figure 4C:
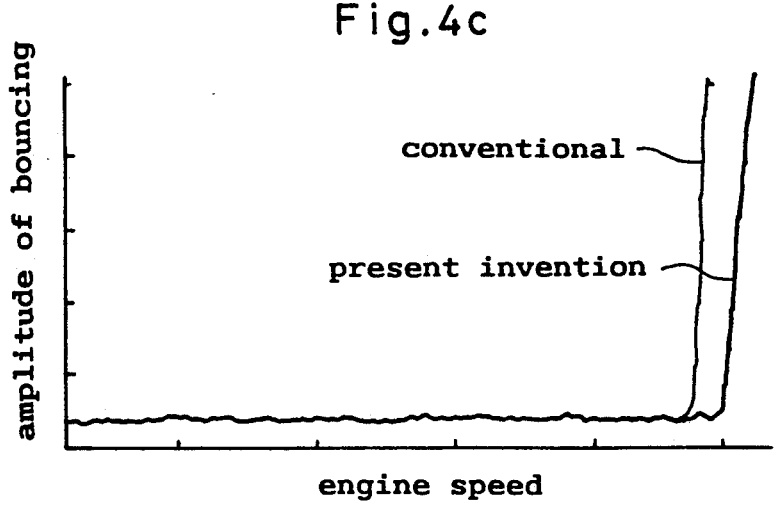

FIG. 4c shows the amplitude of valve bouncing to demonstrate the effect of weight reduction on the performance of the valve spring system. Since the coil spring of the present invention weighs approximately 25% less than a comparable conventional coil spring, the critical engine speed beyond which the amplitude of valve bouncing sharply increases is raised by approximately 300 rpm, and this contributes to the improvement of the high speed performance of the engine.

Figure 5:
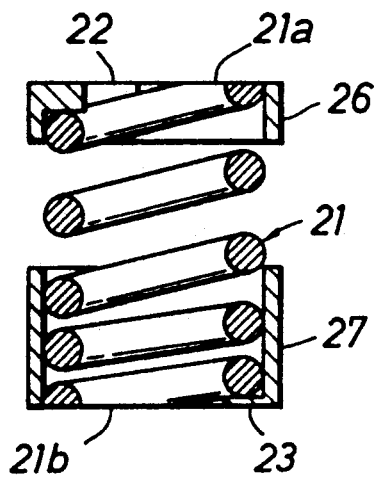
FIG. 5 is a longitudinal sectional view of a second embodiment of the present invention.

FIG. 5 shows a second embodiment of the present invention. According to the coil spring 21 of this embodiment, the two ends 21a and 21b are both formed as open ends, and the coil spring is formed as a two-stage uneven pitch coil spring in which the moveable end 21a has a relatively coarse winding pitch while the fixed end 21b has a relatively fine winding pitch. The spring seat members 22 and 23 for supporting the two ends of the coil spring 21 are each provided with a tubular portion 26 or 27 which surrounds the coil spring 21 instead of being received therein as was the case with the central tubular portions 6 and 7 of the previously described embodiment.

Figure 6:
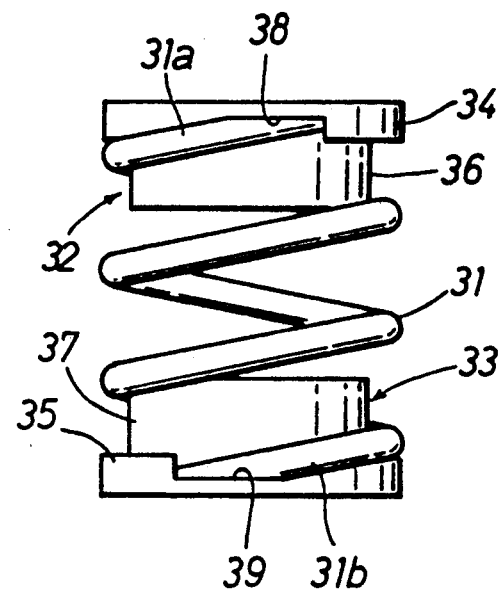
FIGS. 6 through 12 are views similar to FIG. 1 showing different embodiments of the present invention.

FIG. 6 shows a third embodiment of the present invention. The flanges in the previous embodiments were fan-shaped so that the parts corresponding to the ground surfaces at the outer most end portions of the coil springs are not supported by the spring seat members. However, according to the third embodiment, the flanges 34 and 35 are provided along the entire circumference of the spring seat members 32 and 33 so that the end portions 31a and 31b of the coil spring 31 may be supported entirely by annular shoulder surfaces 38 and 39 defined by the flanges 34 and 35 and central tubular portions 36 and 37, respectively. Therefore, the ground wire ends of the coil wire are not in direct contact with other members such as a cylinder head of an internal combustion engine, and this promotes the damping effect of the spring seat members 32 and 33.

Figure 7:
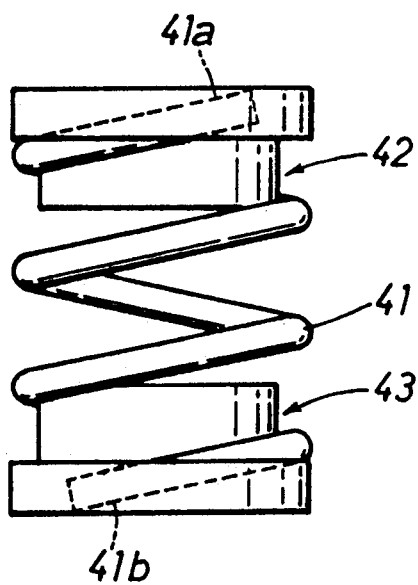

FIG. 7 shows a fourth embodiment of the present invention in which the coil spring 41 is wound at even pitch over its entire length, and is provided with open ends 41a and 41b in the same way as the first embodiment. According to this embodiment, however, its end portions 41a and 41b are not ground but embedded inside valve seat members 42 and 43 which are made of synthetic resin, by insert molding. The wire ends are passed through the entire thickness of the valve seat members 42 and 43 in this embodiment, but, alternatively, the wire ends may be terminated inside the valve seat members 42 and 43. Also, even when the valve seat members 42 and 43 are made of metallic material such as aluminum alloy, it is possible to obtain a similar structure.

Figure 8:
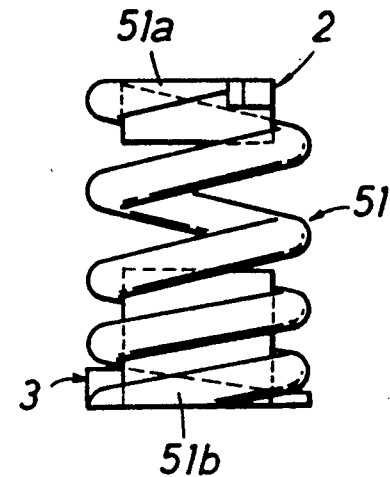

FIG. 8 shows a fifth embodiment of the present invention in which spring seat members 2 and 3 identical to those illustrated in FIG. 1 are combined with an open end two-stage uneven pitch coil spring 51, and are employed to support its two ends 51a and 51b.

Figure 9:
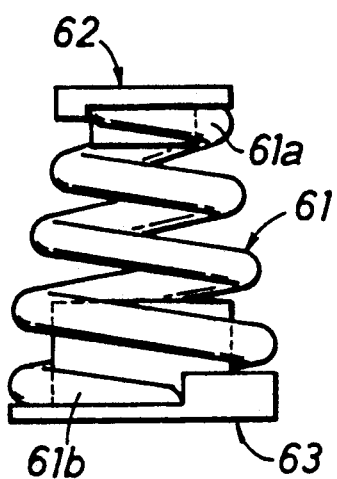

FIG. 9 shows a sixth embodiment of the present invention in which the coil spring 61 consists of a conical spring having open ends 61a and 61b with the end having a smaller diameter being used as a moveable end. The two ends 61a and 61b may be supported by any of the spring seat members given in the foregoing embodiments. According to this embodiment, it is possible to obtain a favorable nonlinear spring property, and to reduce the mass of the moving part. Also, the twisting stress of the coil wire may be reduced.

Figure 10:
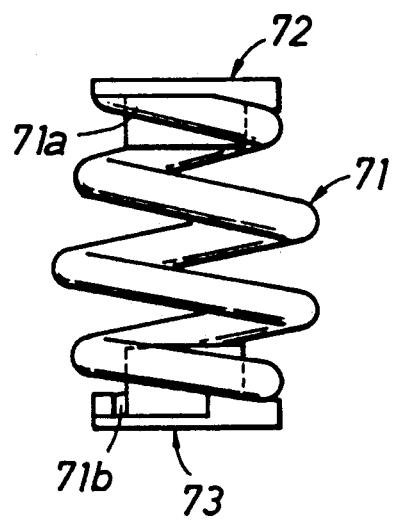

FIG. 10 shows a seventh embodiment of the present invention using a barrel shaped coil spring 71 having a relatively small diameter at its two ends 61a and 61b and a relatively large diameter at its middle portion. The two ends 61a and 61b are formed as open ends, and are supported by spring seat members 72 and 73, respectively. This embodiment offers advantages similar to those of the sixth embodiment.

Figure 11:
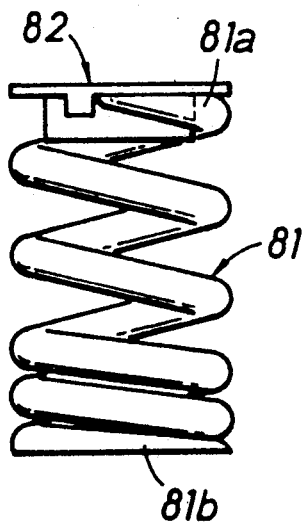

FIG. 11 shows a eighth embodiment of the present invention which uses a coil spring 81 having a moveable end 81a formed as an open end and a fixed end 81b formed as a closed end. The coil spring 81 itself consists of a two-stage uneven pitch coil spring. According to this embodiment, it is possible to do away with a spring seat member at the fixed end. According to this embodiment, there is a slight increase in the overall height due to the presence of the closed end involving an ineffective length of the coil wire at its fixed end, but it offers the advantage of reducing the complexity of the structure. Generally, since the fixed end has very little influence on the overall dynamic behavior of the coil spring, a slight increase in the mass of the fixed end does not necessarily produce any appreciable effect, and the impulsive contact between different parts of the coil wire is not a significant problem when the coil wire is made of steel.

Figure 12:
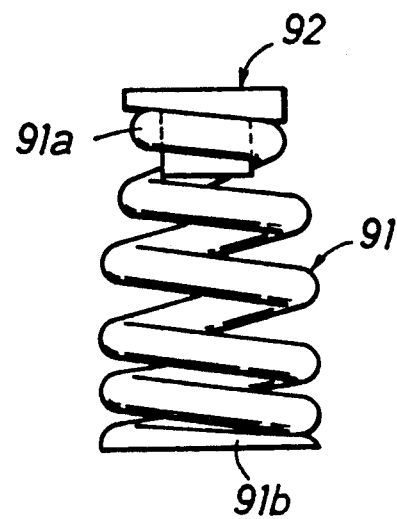

FIG. 12 shows an ninth embodiment of the present invention which is based on a similar principle as the eighth embodiment. According to this embodiment, the coil spring 91 consists of a two-stage uneven pitch conical coil spring. Its moveable end 91a has a relatively small diameter, and is wound at a relatively coarse pitch. Its fixed end 91b has a relatively large diameter, and is wound at a relatively fine pitch. In this case also, the moveable end 91a is provided with a spring seat member 92, but the fixed end 91b may be not provided with any spring seat member.

Thus, according to the present invention, since the mass of the spring system, in particular the mass of the moving part thereof, can be substantially reduced, it is possible to raise the speed limit of the associated mechanical moving part. Further, since the length of the coil wire which does not contribute to the generation of spring force is substantially eliminated, the overall height of the spring system may be reduced. If the spring seat member is made of material having favorable visco-elastic property, or there is a favorable friction between the end portions of the coil spring and the spring seat members, it is possible to obtain a desired damping effect.

It should be understood that while preferred embodiments of the invention have been shown and described, they are only illustrative and may be modified by those skilled in the art without departing from the scope thereof. For instance, the various coil springs and spring seat members may be used in any desired combinations, and the application of these combinations are not limited to internal combustion engines but may be found in any mechanical structures where a spring force is required to be applied to a reciprocating member.

What we claim is:

1. A spring system for one of an intake valve and an exhaust valve of an internal combustion engine, comprising:

a coil spring made of steel and having a moveable end engaged to a valve stem of said valve via a spring retainer and a fixed end engaged to a cylinder head of said internal combustion engine, said moveable end being formed as an open end and being provided with a ground surface which is substantially perpendicular to an axial line of said coil spring; and a separate spring seat member interposed between said moveable end of said coil spring and said spring retainer, and having a receiving surface contoured to evenly receive said moveable end of said coil spring;

said spring seat member being provided with a notch through which said moveable end extends for bringing said ground surface of said coil spring into direct contact with said spring retainer, wherein said spring seat member is provided with a tubular portion which fits onto an outer circumference of said coil spring in sliding engagement.

2. A spring system for one of an intake valve and an exhaust valve of an internal combustion engine, comprising:

a coil spring made of steel and having a moveable end engaged to a valve stem of said valve via a spring retainer and a fixed end engaged to a cylinder head of said internal combustion engine, said moveable end being formed as an open end and being provided with a ground surface which is substantially perpendicular to an axial line of said coil spring; and a separate spring seat member interposed between said moveable end of said coil spring and said spring retainer, and having a receiving surface contoured to evenly receive said moveable end of said coil spring;

said spring seat member being provided with a notch through which said moveable end extends for bringing said ground surface of said coil spring into direct contact with said spring retainer, wherein said spring seat member is provided with a stopper for engaging a wire end of said moveable end of said coil spring against circumferential movement thereof.

3. A spring system for one of an intake valve and an exhaust of an internal combustion engine, comprising:

a coil spring made of steel and having a moveable end engaged to a valve stem of said valve via a spring retainer and a fixed end engaged to a cylinder head of said internal combustion engine, said moveable end being formed as an open end and being provided with a ground surface which is substantially perpendicular to an axial line of said coil spring; and a separate spring seat member interposed between said moveable end of said coil spring and said spring retainer, and having a receiving surface contoured to evenly receive said moveable end of said coil spring;

said spring seat member being provided with a notch through which said moveable end extends for bringing said ground surface of said coil spring into direct contact with said spring retainer;

wherein said fixed end is formed as an open end, and a spring seat member having a receiving surface contoured to snugly receive said fixed end of said coil spring is interposed between said fixed end of said coil spring and said fixed member, wherein said spring seat member for said fixed end of said spring member is provided with a stopper for engaging a wire end of said fixed end of said coil spring against circumferential movement thereof.

* * * * *